US012657649B2

(12) United States Patent
Nutter et al.

(10) Patent No.: US 12,657,649 B2
(45) Date of Patent: Jun. 16, 2026

(54) CACHE PROBE OPERATION FOR DETECTION OF MISSING DATA

(71) Applicant: Advanced Micro Devices, Inc., Santa Clara, CA (US)

(72) Inventors: Mark Richard Nutter, Austin, TX (US); Aaron Michael Knoll, Santa Clara, CA (US); Madhusudhanan Srinivasan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 152 days.

(21) Appl. No.: 18/540,348

(22) Filed: Dec. 14, 2023

(65) Prior Publication Data

US 2025/0200699 A1    Jun. 19, 2025

(51) Int. Cl.
| | |
|---|---|
| *G06T 1/60* | (2006.01) |
| *G06T 15/00* | (2011.01) |
| *G06T 15/06* | (2011.01) |

(52) U.S. Cl.
CPC .............. *G06T 1/60* (2013.01); *G06T 15/005* (2013.01); *G06T 15/06* (2013.01); *G06T 2210/21* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 9,529,942 B1 * | 12/2016 | Chakraborty | ........... G06T 15/00 |
| 2005/0179686 A1 * | 8/2005 | Christensen | ............ G06T 15/40 |
| | | | 345/423 |
| 2006/0066607 A1 * | 3/2006 | Schmittler | .............. G06T 15/40 |
| | | | 345/419 |
| 2009/0073177 A1 * | 3/2009 | Jiao | ........................... G06T 1/60 |
| | | | 345/501 |
| 2012/0081368 A1 * | 4/2012 | Park | ...................... G06T 15/005 |
| | | | 345/426 |
| 2015/0317818 A1 * | 11/2015 | Howson | .................... G06T 1/20 |
| | | | 345/424 |
| 2017/0256020 A1 * | 9/2017 | Sansottera | ................ G06T 1/20 |

(Continued)

OTHER PUBLICATIONS

Meister, D., et al.; "On Ray Reordering Techniques for Faster GPU Ray Tracing"; 13D '20: Symposium on Interactive 3D Graphics and Games, May 2020, 9 pgs.

(Continued)

*Primary Examiner* — Andrew G Yang

(74) *Attorney, Agent, or Firm* — Volpe Koenig

(57) ABSTRACT

A technique for performing a path tracing operation is provided. A cache is interrogated using a probe operation that returns a Boolean result for each of a plurality of scene data elements associated with the path tracing operation. The Boolean result indicates presence or absence of a scene data element in the cache. The path tracing operation executes at least a first instruction based at least in part on the probe operation returning a Boolean result indicating absence of one of the scene data elements in the cache. The path tracing operation executes at least a second instruction based at least in part on the probe operation returning a Boolean result indicating presence of said one scene data element in the cache, wherein the first instruction is different from the second instruction.

20 Claims, 6 Drawing Sheets

(56) References Cited

U.S. PATENT DOCUMENTS

| | | | |
|---|---|---|---|
| 2018/0082465 A1* | 3/2018 | Surti | G06T 15/503 |
| 2021/0303467 A1* | 9/2021 | Mandal | G06F 12/0831 |
| 2022/0068008 A1* | 3/2022 | Livesley | G06T 15/005 |

OTHER PUBLICATIONS

Aila, T., & Karras, T., "Architecture Considerations for Tracing Incoherent Rays", High Performance Graphics, Jun. 2010, 10 pgs.
Shin, S., et al., "Scheduling Page Table Walks for Irregular GPU Applications", downloaded from: https://www.cs.yale.edu/homes/abhishek/sshin-gcox-isca18.pdf on Dec. 14, 2023, 13 pgs.
Takikawa, T., et al.; "Variable Bitrate Neural Fields", arXiv:2206.07707v1 [cs.CV], Jun. 15, 2022, 10 pgs.

* cited by examiner

CACHE PROBE OPERATION FOR DETECTION OF MISSING DATA

BACKGROUND

Light modelling techniques are used in computer graphics to create realistic images and visual effects. For example, ray tracing involves simulating the behavior of light rays as they travel through a virtual 3D environment, allowing for the accurate calculation of reflections, shadows, and other lighting effects. Light modelling techniques can have variable computation load and irregular memory access patterns that can bottleneck performance on single-instruction-multiple-data ("SIMD") and non-SIMD architectures, and contemporary GPUs and CPUs. These problems can, for example, cause execution for a SIMD wavefront to stall on data loads if any of the requested data are unavailable in caches, often at the expense of 100s-1000s of instruction cycles. This effect is made worse when large scene data is stored in remote memory, such as on another chip, in non-volatile storage, or across a network. In the most extreme of these cases, the penalty for a cache miss can be stalls on the order of millions of execution cycles.

BRIEF DESCRIPTION OF THE DRAWINGS

A more detailed understanding may be had from the following description, given by way of example in conjunction with the accompanying drawings wherein.

DETAILED DESCRIPTION

Light modelling techniques can stall if there is a cache miss (e.g., if requested data is unavailable). This disclosure provides techniques for mitigating this problem. This disclosure uses the term "path tracing" to refer generally to light modelling techniques in graphics processing, and includes classic ray casting and ray tracing techniques, as well as other techniques.

A technique for performing a path tracing operation is provided herein. A cache is interrogated using a probe operation that returns a Boolean result for each of a plurality of scene data elements associated with the path tracing operation. The Boolean result indicates presence or absence of a scene data element in the cache. The path tracing operation executes at least a first instruction based at least in part on the probe operation returning a Boolean result indicating absence of one of the scene data elements in the cache. The path tracing operation executes at least a second instruction based at least in part on the probe operation returning a Boolean result indicating presence of said one scene data element in the cache, wherein the first instruction is different from the second instruction. In some examples, the probe operation returns Boolean results for the plurality of scene data elements without waiting for one or more of the scene data elements to arrive at the cache.

In some embodiments, the path tracing operation is a ray tracing operation, and the probe operation is performed in hardware by a ray intersection test unit associated with the ray tracing operation. In some examples, the ray intersection unit causes substitution of a lower-level-of-detail approximation for one or more scene data elements absent from the cache, wherein the lower-level-of-detail approximation is substituted in response to a threshold number of ray bounces associated with the one or more scene data elements being exceeded. In other examples, the probe operation is implemented as a software instruction executed by a SIMD.

In some embodiments, the first instruction includes a prefetch request to a remote memory for one or more of the scene data elements. In other examples, the probe operation returns a Boolean result corresponding to nil for each scene data element absent from the cache, and returns the scene data element for each scene data element present in the cache.

In some embodiments, the second instruction includes resetting a least recently used ("LRU") counter for one or more scene data elements in the cache that are the subject of the probe and that are present in the cache.

Figure 1:
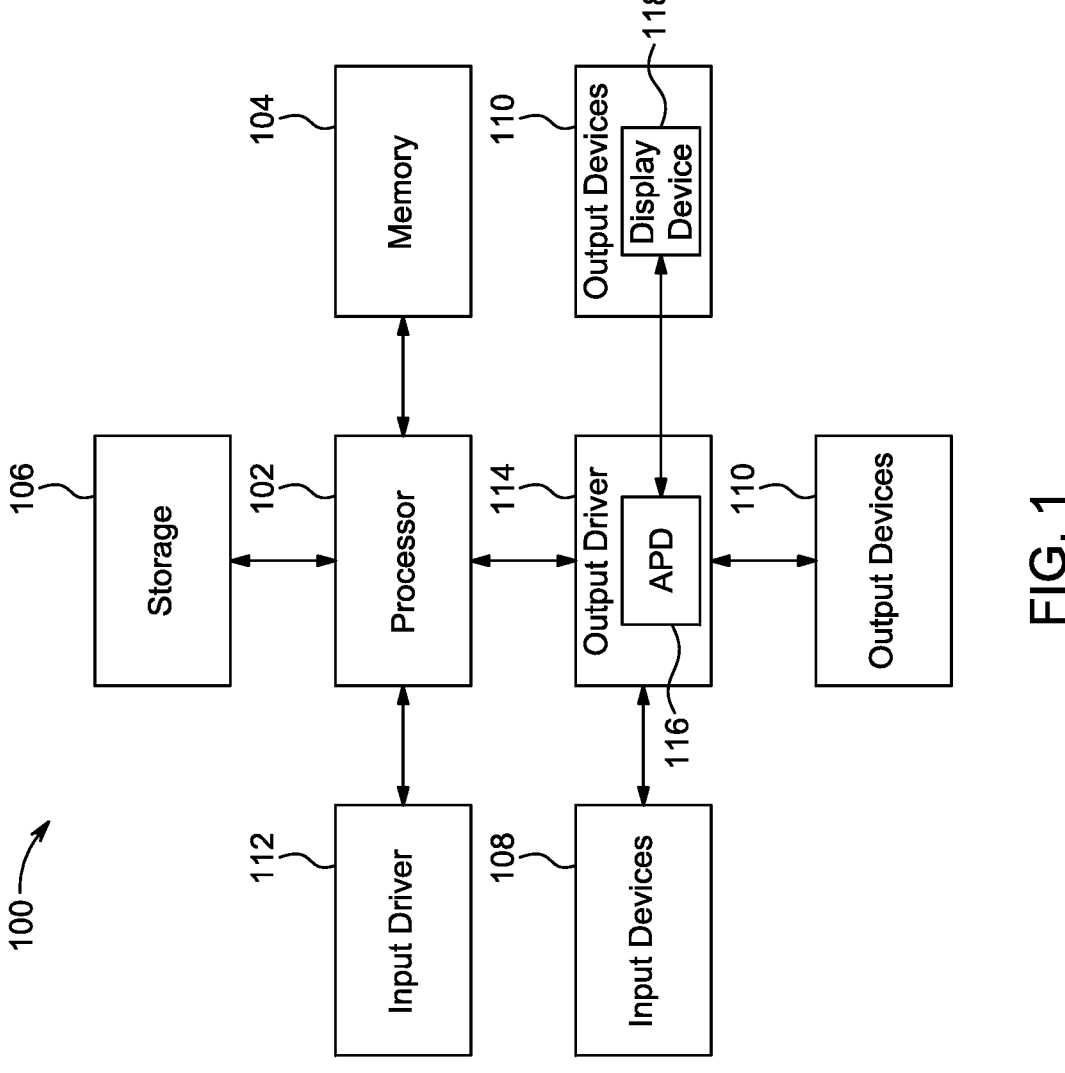
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
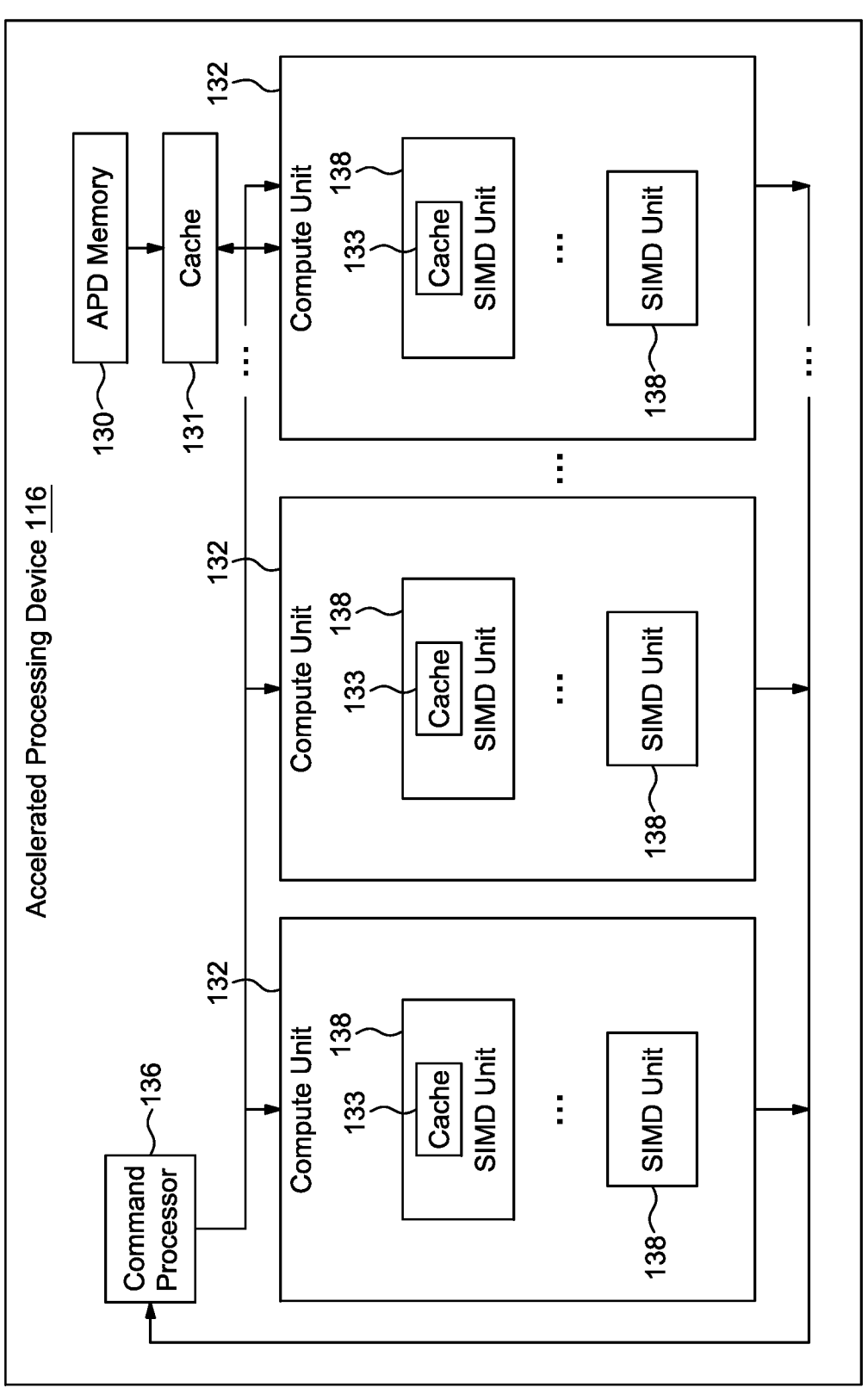
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local cache L1. In an implementation, multiple compute units 132 share a cache 131 which accesses APD memory 130. In some examples, cache 131 is cache hierarchy or L2 cache which access APD memory 130. In other examples, each compute unit 132 includes a cache 133 which, e.g., accesses APD memory 130.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
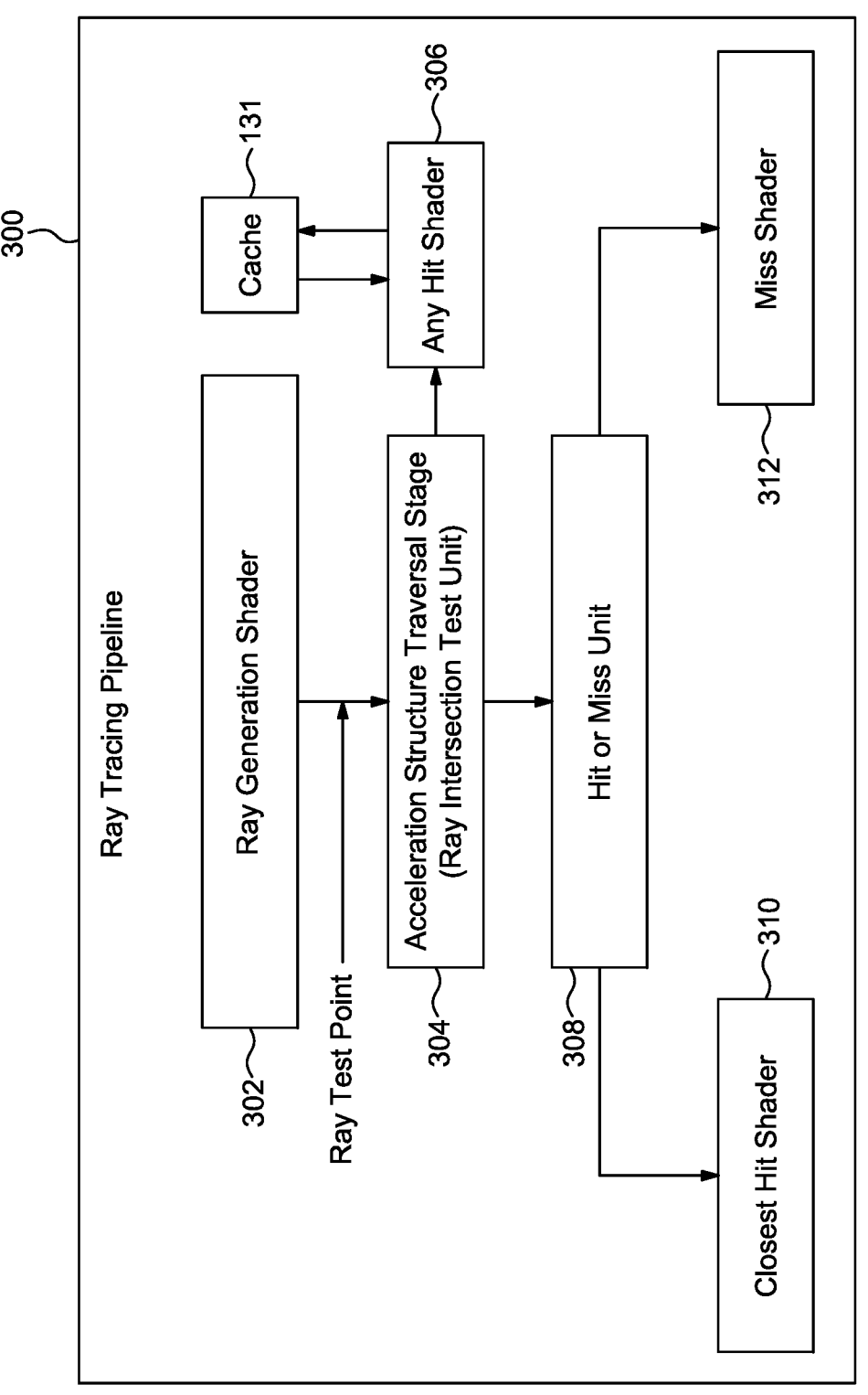
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit

304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for the closest hit shader 310 or the miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

In real-time path tracing, execution for a SIMD wavefront will stall on data loads if any of the requested data are unavailable in the cache 131, often resulting in the expense of 100s-1000s (or in a worst case, millions) of instruction cycles. This effect is made worse when large scene data is stored in a remote memory, such as memory 104 or storage 106. Path tracing for non-SIMD implementations will also stall if there is a cache miss. A cache probe operation is described herein to reduce or eliminate these problems. In one example, the cache probe operation is implemented as an instruction to the SIMD units 138 that returns a Boolean for each scene element requested. In an example of a system with a multilevel cache hierarchy, the probe indicates presence of a scene element through the last level cache (LLC). As used herein, a "scene element" is one or more triangles to be rendered, or any other data required for operation of a path tracing operation. Below is pseudocode illustrating an exemplary embodiment of the cache probe operation implemented as a software function:

```
1 Algorithm: CacheProbe (C, E):
2 Input: C, a cache of scene elements
3 E, a list of desired scene elements
4 Output: P, a list of bools indicating presence
5
6 for i,e in enumerate (E):
```

7 P[i]=C.lookup(C, E[i])? true:false

8

9 return P

In the pseudocode above, inputs to the CacheProbe algorithm include a cache (C) and a list of one or more desired scene elements (E). The output in this example is a list of booleans (P) indicating the presence/absence of each of the desired scene element(s). The "for loop" (at lines 6-7) repeats the lookup operation at line 7 for a number of times corresponding to the integer "i"; where "i" corresponds to the number of desired scene element(s) in the list (E). Each iteration of the for loop probes the cache (C) for the presence/absence of a different one of the desired scene element(s) (E). After the iterations are complete, the algorithm returns the list of booleans (P) indicating the presence/absence in the cache (C) of each of the desired scene element(s) (E).

Figure 4:
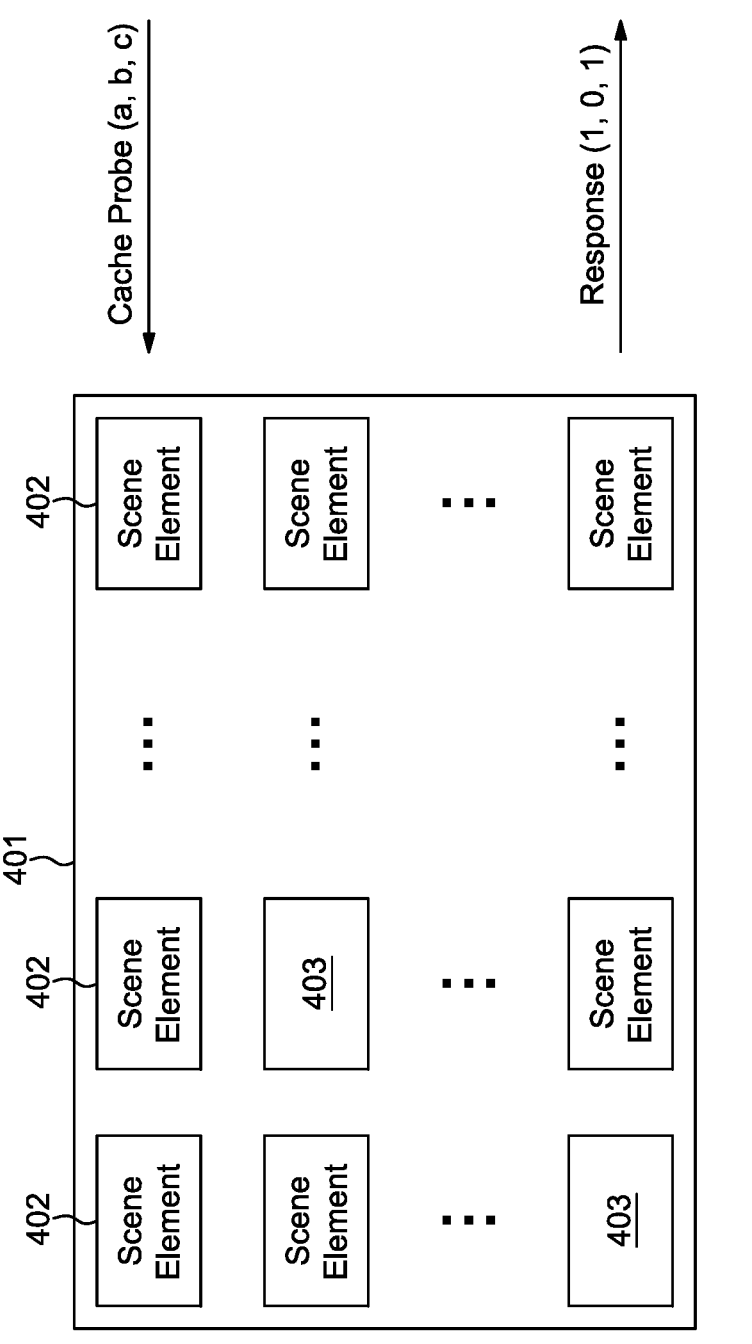
FIG. 4 illustrates implementation of a cache probe operation according to an example.

FIG. 4 illustrates implementation of a cache probe operation according to the pseudocode set forth above. In FIG. 4, cache 401 includes a plurality of locations were desired scene elements 402 are stored, as well as other locations 403 where desired scene elements are absent. In the example shown, the cache probe includes a list of three desired scene elements (a, b, c). The output (or response) in this example is a list of three booleans (1, 0, 1) indicating that scene elements a and c are present in cache 401, while scene element b is absent.

In some embodiments, the cache probe operation is implemented as a non-blocking cache probe, meaning that the probe interrogates the cache data without waiting for the data that is the subject of the probe to arrive. In some examples, one cache probe can be sent and then another cache probe can be sent without waiting for and before receiving the results from the first probe. In one example shown in FIG. 3, the cache probe instruction is issued by any hit shader 306 to cache 131, and the output of the probe is returned to any hit shader 306. In another example, the cache probe operation is implemented within intersection test unit 304 of FIG. 3.

Figure 5:
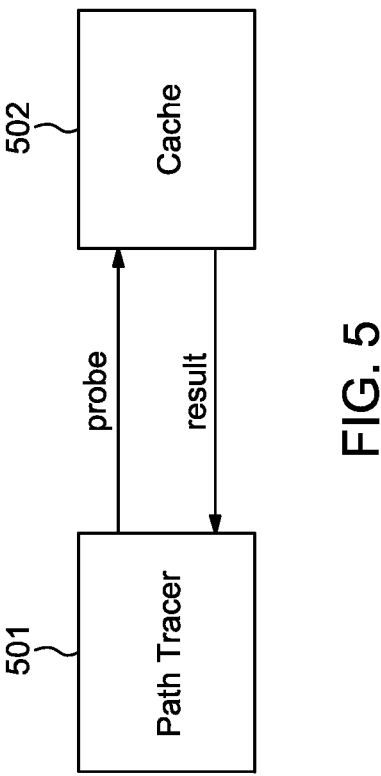
FIG. 5 illustrates the operation of a cache probe operation connection with a path tracer operation, according to a further example.

Application of the cache probe described herein is not limited to the ray tracing operation illustrated in FIG. 3. FIG. 5 illustrates implementation of a cache probe operation in connection with a path tracer 501. Path tracer 501 corresponds, for example, to any software that implements a light modelling technique in graphics processing, including classic ray casting and ray tracing techniques, as well as more modern path tracing techniques. Path tracer 501 is implemented, e.g., on processor 102, a CPU, a GPU, Accelerated Processing Device 116, a SIMD unit 138, or any other processor. In the general embodiment of FIG. 5, path tracer 501 executes a cache probe algorithm that probes cache 502 for the presence/absence of one or more desired scene elements. A result of the cache probe algorithm is returned to path tracer 501 from cache 502 in the form of, e.g., a list of booleans indicating the presence/absence of the desired scene elements.

Referring still to FIG. 5, the cache probe operation interrogates the cache and returns a Boolean result for each of a plurality of scene data elements associated with a path tracing operation. The Boolean result indicates presence or absence in the cache of each scene data element that was the subject of the cache probe operation. The path tracer 501 then uses one or more of the Boolean results to identify how processing should proceed. In some cases, the path tracer 501 uses only the Boolean result(s) to identify how processing should proceed, while in other cases, the path tracer 501 analyzes the Boolean results in combination with other information to identify how processing should proceed.

One example of how the path tracing operation uses the Boolean results to identify how processing should proceed involves substitution of a lower-level-of-detail approximation for scene data elements which the Boolean results indicate are absent from the cache. In this example, rather than incurring the expense of a cache miss as a result of the scene data elements that are absent from the cache, the path tracing operation substitutes a lower-level-of-detail approximation for the absent scene data elements. While this approach results in a loss of detail, the result is preferable to the consequences of a cache miss associated with the absent scene data elements. In some cases, the path tracing operation uses other information in addition to the Boolean results to identify whether to substitute a lower-level-of-detail approximation for the absent scene data elements.

In one such example, for each of the absent scene data elements, the path tracing operation compares a number of ray bounces associated with the absent scene element to a threshold, and substitutes the lower-level-of-detail approximation for those absent scene data elements where the threshold is exceeded. In path tracing, a "ray bounce" refers to the interaction of a ray of light (or a virtual ray) with a surface in a scene. In a path tracing is a rendering algorithm, a ray is cast from the camera into the scene, and when it hits a surface, it can undergo different interactions, such as reflection, refraction, or absorption. Each of these interactions is a "bounce." The path tracing algorithm follows these bounces to simulate the behavior of light in a more physically accurate way. Path tracing algorithms typically trace rays backward from the camera into the scene, following these bounces until a certain termination condition is met (such as a maximum number of bounces or when the ray's contribution to the final image is negligible). In examples of the cache probe operations described herein, when the cache probe result indicates the absence of a scene element, the path tracing operation compares a number of ray bounces (e.g., from the camera) associated with the absent scene element to a threshold, and substitutes the lower-level-of-detail approximation for those absent scene data elements where the threshold is exceeded. In some embodiments, the Boolean results of the cache probe operation are provided as a hint to any hit shader 306, which then determines whether substitution a lower-level-of-detail approximation for the absent scene data elements takes place.

Another example of how the path tracing operation uses the Boolean results to identify how processing should proceed involves the resetting of LRU counters for certain data present in the cache. In an LRU cache, each item in the cache is assigned a counter based on when it was last accessed. When the cache reaches its capacity and needs to make room for a new item, the LRU algorithm identifies the least recently used item (the one with the counter indicating the least recent usage) and removes it from the cache to make space for the new item.

In some embodiments, the path tracing operation uses the Boolean results of the cache probe to reset the LRU counters associated with those scene data elements that were the subject of the cache probe and present in the cache. In these embodiments, the scene data elements that are the subject of the cache probe correspond to scene data elements that the path tracing operation expects to need in the near future. By resetting the LRU counters for those scene data elements that the probe indicates are present in the cache, this approach lessens the possibility that those scene data elements will be evicted from the cache before they are needed.

A further example of how the path tracing operation uses the Boolean results to identify how processing should proceed involves issuing a prefetch request to pull absent scene elements into the cache for future use. In general, the goal of prefetching is to make data available in the cache before it is needed in order to eliminate the latency of a slower data source below the cache. However, prefetching involves several costs, including cache space to keep the prefetched data and processing to carry out the prefetch. If the prefetched data is not subsequently used, the cost of prefetching often reduces performance. In some embodiments where Boolean result(s) of the cache probe operation indicate that one or more of the probed scene data elements are absent from the cache, the path tracing operation issues prefetch requests for one or more of the absent scene data elements. In some examples, the issuance of the cache probe is timed such that the Boolean results are returned sufficiently in advance to allow for the time it takes to prefetch the absent data. In other examples, the path tracing operations are reordered so that prefetching occurs while elements that are in the cache are processed by the path tracing algorithm.

In some examples, the result returned by the cache probe for each scene data element includes more than just a single bit indicating presence or absence of each of the probed scene data elements. For example, in one case, the results returned by the cache probe operation include a (i) presence array (indicating presence/absence of each of the probed scene data elements) and (ii) the scene data that was the subject of the probe operation and also present in the cache.

The cache probe operation may be advantageously employed for path-tracing of large scale, dynamic scenes. By being better informed about the availability of large scene data in caches, the path tracer operation makes informed decisions effecting real-time QoS. In one example, a budget for the number of worst-case cache misses per frame is factored into the rendering time for a large scene, such that exceeding this budget will break the desired QoS. In such a case, the path tracing operation uses the results returned by the cache probe operation to make trade-offs between rendering quality and speed. In other cases, the path tracing operation uses the results returned by the cache probe operation approach to trade off one resource (e.g., energy, bandwidth) for another (e.g., computation).

For small scenes, it may be possible to load, a priori, all scene data into a fast, near memory, and thereby reduce the risk of a cache miss. However, this approach requires all scene data to be maintained in a near memory, which can be relatively small and expensive, regardless of whether all of the scene data is needed for path-tracing of a given frame. In some cases, the cache probe operation described herein is advantageously deployed even in the case of small scenes to reduce the amount of near-memory needed for path tracing operations.

Figure 6:
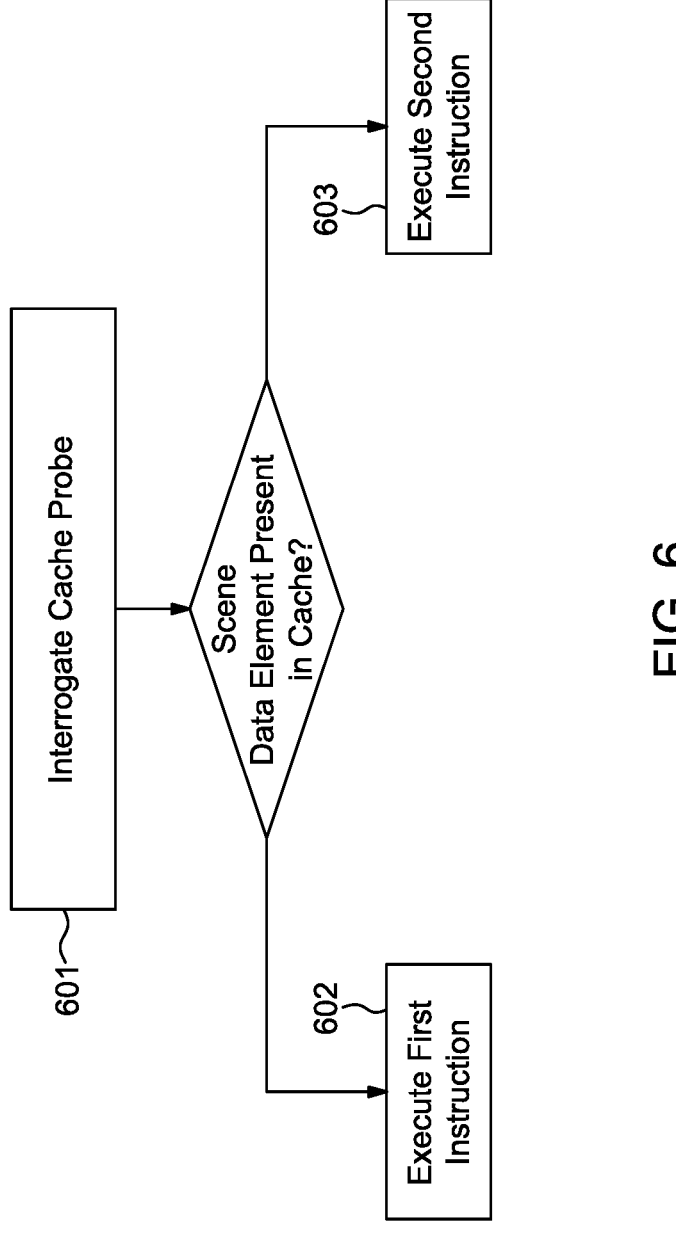
FIG. 6 is a flow diagram of a method for performing a cache probe operation, according to an example.

FIG. 6 is a flow diagram of a method for performing a cache probe operation, according to an example. In step 601, a cache is interrogated using a probe operation. During a path tracing operation, a path tracer 501 interrogates the cache to determine the presence/absence of desired scene elements. The path tracer includes any software that implements a light modelling technique in graphics processing, including classic ray casting and ray tracing techniques, as well as more modern path tracing techniques, and is implemented on processor 102, a CPU, a GPU, Accelerated Processing Device 116, a SIMD unit 138, or any other suitable processor. In one example, the cache probe operation is implemented as an instruction to the SIMD units 138 that returns a Boolean for each scene element requested. In some embodiments, the cache probe operation is implemented as a non-blocking cache probe, meaning that the probe interrogates the cache data without waiting for the data that is the subject of the probe to arrive. In some example, the probe operation returns a Boolean result for one or more scene data elements associated with a path tracing operation. The Boolean result indicates presence or absence of a scene data element in the cache. In some examples, the Booleans results are in the format of a presence array (indicating presence/absence of each of the probed scene data elements). In some examples, scene data elements that were the subject of the cache probe and present in the cache are included in the results returned to the path tracer.

In step 602, the path tracing operation executes at least a first instruction based at least in part on the probe operation returning a Boolean result indicating absence of one of the scene data elements in the cache. By way of example, in a case where the cache probe operation returns a result indicating absence of one or more scene data elements from the cache, the first instruction corresponds to an instruction causing any hit shader unit 306 to substitute a lower-level-of-detail approximation for the absent scene data elements.

In step 603, the path tracing operation executes at least a second instruction based at least in part on the probe operation returning a Boolean result indicating presence of said one scene data element in the cache, wherein the first instruction is different from the second instruction. Continuing with the same example described above, in a case where the cache probe operation returns a result indicating presence of one or more scene data elements from the cache, the second instruction corresponds to an instruction causing any hit shader unit 306 to use the scene data elements present in the cache for processing.

In other examples, the first instruction corresponds to a prefetch request to a remote memory for one or more of the absent scene data elements. While in still further examples, the second instruction corresponds to resetting an LRU counter for one or more scene data elements that are the subject of the probe and that are present in the cache. In some cases, the path tracing operation uses the results returned by the cache probe operation to make trade-offs between rendering quality and speed. In other cases, the path tracing operation uses the results returned by the cache probe operation approach to trade off one resource (e.g., energy, bandwidth) for another (e.g., computation)

In some examples, the probe operation returns Boolean results for the plurality of scene data elements without waiting for one or more of the scene data elements to arrive at the cache. The probe operation is performed either in hardware, e.g. by a ray intersection test unit associated with the ray tracing operation, or is implemented as a software instruction executed by, e.g., a SIMD. In some cases, the path tracing operation uses only the Boolean result(s) to identify how processing should proceed, while in other cases, the path tracing operation analyzes the Boolean results in combination with other information to identify how processing should proceed.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering a scene by performing a path tracing operation, the method comprising:

for each scene data element among a plurality of scene data elements that are referenced by the path tracing operation, executing, as part of the path tracing operation, a first instruction responsive to the scene data element being indicated as absent from a cache by a cache probe and a second instruction responsive to the scene data element being indicated as present in the cache by the cache probe; and rendering the scene based on execution of the first instruction or the second instruction, wherein the first instruction is different from the second instruction, wherein the execution of the first instruction comprises substituting a lower-level-of-detail approximation for the scene data element absent from the cache when a threshold number of ray bounces that references the scene data element is exceeded.

2. The method of claim 1, wherein the cache probe returns prior to one or more of the scene data elements arriving at the cache.

3. The method of claim 1, wherein the path tracing operation is a ray tracing operation or ray casting operation.

4. The method of claim 3, wherein the cache probe is performed in hardware by a ray intersection test unit associated with the ray tracing operation.

5. The method of claim 1, wherein the cache probe is implemented as a software instruction executed by a SIMD.

6. The method of claim 1, wherein the second instruction comprises resetting an LRU counter for the scene data element in the cache.

7. The method of claim 1, wherein the cache probe returns, for each scene data element absent from the cache, a presence indicator set to a first Boolean value and no respective scene data element, and returns, for each scene data element present in the cache, a respective presence indicator set to a second Boolean value and the respective scene data element identifying the scene data element in the cache.

8. The method of claim 1, wherein the first instruction comprises a prefetch request to a remote memory for one or more of the plurality of the scene data elements.

9. The method of claim 1, wherein the cache probe returns, for each of the plurality of scene data elements, a respective presence indicator in a presence array, and wherein executing the first instruction or the second instruction comprises consulting the presence array to determine whether to substitute the lower-level-of-detail approximation.

10. The method of claim 1, wherein the threshold number of ray bounces is determined based on a material type or a geometric classification associated with the scene data element.

11. A system for rendering a scene by performing a path tracing operation, the system comprising:

a cache that stores a plurality of scene data elements of the scene; and one or more processors that are communicatively coupled to the cache, wherein the one or more processors are collectively configured to:

for each scene data element among the plurality of scene data elements that are referenced by the path tracing operation, execute, as part of the path tracing operation, a first instruction responsive to the scene data element being indicated as absent from the cache by a cache probe and a second instruction responsive to the scene data element being indicated as present in the cache by the cache probe; and render the scene based on execution of the first instruction or the second instruction, wherein the first instruction is different from the second instruction, wherein the execution of the first instruction comprises substituting a lower-level-of-detail approximation for the scene data element absent from the cache when a threshold number of ray bounces that references the scene data element is exceeded.

12. The system of claim 11, wherein the cache probe returns without waiting for one or more of the scene data elements to arrive at the cache.

13. The system of claim 11, wherein the path tracing operation is a ray tracing or ray casting operation.

14. The system of claim 13, wherein the cache probe is performed in hardware by a ray intersection test unit associated with a ray tracing operation.

15. The system of claim 11, wherein the cache probe is implemented as a software instruction executed by a SIMD.

16. The system of claim 11, wherein the second instruction comprises resetting an LRU counter for the scene data elements in the cache.

17. The system of claim 11, wherein the cache probe returns for each scene data element absent from the cache, the respective presence indicator set to a first Boolean value and no respective scene data element, and returns, for each scene data element present in the cache, the respective presence indicator set to a second Boolean value and the respective scene data element identifying the scene data element in the cache.

18. The system of claim 11, wherein the cache probe returns, for each of the plurality of scene data elements, a respective presence indicator in a presence array, and wherein the one or more processors are collectively configured to consult the presence array to determine whether to substitute the lower-level-of-detail approximation.

19. The system of claim 11, wherein the one or more processors are collectively configured to determine the threshold number of ray bounces based on a material type or a geometric classification associated with the scene data element.

20. A non-transitory computer-readable medium storing instructions for rendering a scene by performing a path tracing operation, the instructions when executed by a processor, cause the processor to perform operations comprising:

for each scene data element among a plurality of scene data elements that are referenced by the path tracing operation, executing, as part of a cache the path tracing operation, a first instruction responsive to the scene data element being indicated as absent from a cache by a cache probe and a second instruction responsive to the scene data element being indicated as present in the cache by the cache probe; and rendering the scene based on execution of the first instruction or the second instruction, wherein the first instruction is different from the second instruction, wherein the execution of the first instruction comprises substituting a lower-level-of-detail approximation for the scene data element absent from the cache when a threshold number of ray bounces that references the scene data element is exceeded.

* * * * *